US 11,149,948 B2

(12) United States Patent
Stevens et al.

(10) Patent No.: US 11,149,948 B2
(45) Date of Patent: Oct. 19, 2021

(54) FUEL NOZZLE WITH ANGLED MAIN INJECTION PORTS AND RADIAL MAIN INJECTION PORTS

(71) Applicant: General Electric Company, Schenectady, NY (US)

(72) Inventors: Eric John Stevens, Mason, OH (US); Mark David Durbin, Springboro, OH (US); Randall Charles Boehm, Loveland, OH (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 181 days.

(21) Appl. No.: 15/681,990

(22) Filed: Aug. 21, 2017

(65) Prior Publication Data

US 2019/0056110 A1 Feb. 21, 2019

(51) Int. Cl.
| F23R 3/14 | (2006.01) |
| F23R 3/28 | (2006.01) |
| F23R 3/06 | (2006.01) |
| F23R 3/34 | (2006.01) |
| F23R 3/00 | (2006.01) |

(52) U.S. Cl.
CPC ............. *F23R 3/06* (2013.01); *F23R 3/14* (2013.01); *F23R 3/286* (2013.01); *F23R 3/343* (2013.01); *F23R 3/002* (2013.01); *F23R 3/283* (2013.01); *F23R 2900/00014* (2013.01)

(58) Field of Classification Search
CPC .... F23R 3/286; F23R 3/26; F23R 3/34; F23R 3/346; F23R 2900/03343; F23R 3/12; F23R 3/14; F23R 3/28; F23R 2900/00013; F23R 3/283; F23D 17/002; F23C 7/004; F23C 2900/07001
See application file for complete search history.

(56) References Cited

U.S. PATENT DOCUMENTS

| 5,101,633 A * | 4/1992 | Keller .................... F23C 7/004 239/405 |
| 5,203,796 A | 4/1993 | Washam et al. |
| 5,816,049 A | 10/1998 | Joshi |

(Continued)

FOREIGN PATENT DOCUMENTS

| GB | 2515028 A | 12/2014 |
| WO | WO2011/117533 A3 | 9/2011 |

(Continued)

*Primary Examiner* — Todd E Manahan
*Assistant Examiner* — Todd N Jordan
(74) *Attorney, Agent, or Firm* — Venable LLP; Edward A. Kmett; Michele V. Frank

(57) ABSTRACT

The present disclosure is directed to a combustor system including a fuel nozzle comprising a main fuel injector defining an angled main injection port. Each angled main injection port defines an inlet end and an outlet end. The outlet end is oriented downstream relative to the inlet end at an angle relative to a centerline axis of the fuel nozzle. The angled main injection port permits egress of fuel from a main fuel circuit to the combustion chamber. The fuel nozzle further defines a radial main injection port. The outlet end is oriented along an axial direction approximately equal relative to the inlet end and radially outward thereof relative to the centerline axis. The radial main injection port is extended perpendicular relative to the centerline axis.

14 Claims, 12 Drawing Sheets

(56) References Cited

U.S. PATENT DOCUMENTS

| | | | |
|---|---|---|---|
| 6,955,040 B1 * | 10/2005 | Myers, Jr. | F02C 7/22 60/39.281 |
| 7,266,945 B2 * | 9/2007 | Sanders | F23D 11/101 60/743 |
| 7,302,802 B2 | 12/2007 | Alkabie | |
| 7,337,875 B2 | 3/2008 | Proscia et al. | |
| 7,350,357 B2 | 4/2008 | Chen et al. | |
| 7,549,290 B2 | 6/2009 | Holt et al. | |
| 7,805,943 B2 | 10/2010 | Desaulty et al. | |
| 7,856,830 B2 | 12/2010 | Alkabie | |
| 7,857,094 B2 | 12/2010 | Macquisten et al. | |
| 7,874,159 B2 | 1/2011 | Gerendas et al. | |
| 7,926,278 B2 | 4/2011 | Gerendas et al. | |
| 7,942,003 B2 * | 5/2011 | Baudoin | F23R 3/343 60/747 |
| 8,001,761 B2 * | 8/2011 | Myers, Jr. | F23R 3/286 60/39.281 |
| 8,037,688 B2 * | 10/2011 | Hagen | F23R 3/34 60/733 |
| 8,696,774 B2 | 4/2014 | Guo | |
| 8,707,707 B2 | 4/2014 | Venkataraman et al. | |
| 8,763,400 B2 | 7/2014 | Bunker | |
| 8,806,871 B2 * | 8/2014 | McMasters | F23R 3/14 60/742 |
| 8,931,588 B2 | 1/2015 | Murray | |
| 9,033,263 B2 | 5/2015 | Rackwitz | |
| 9,169,804 B2 | 10/2015 | Rupp et al. | |
| 9,188,341 B2 * | 11/2015 | McMasters | F02K 9/52 |
| 9,310,079 B2 | 4/2016 | Uskert | |
| 9,328,926 B2 | 5/2016 | Penz et al. | |
| 2008/0271457 A1 * | 11/2008 | McMasters | F23R 3/002 60/754 |
| 2009/0014561 A1 * | 1/2009 | McMasters | B22F 7/062 239/533.12 |
| 2011/0232288 A1 | 9/2011 | Bizouard et al. | |
| 2013/0042627 A1 | 2/2013 | Gerendas et al. | |
| 2014/0083111 A1 | 3/2014 | Gregg et al. | |
| 2015/0292743 A1 * | 10/2015 | Mook | F23R 3/14 60/806 |
| 2016/0237916 A1 | 8/2016 | Ferreira-Providakis et al. | |
| 2019/0056110 A1 * | 2/2019 | Stevens | F23R 3/06 |
| 2019/0063753 A1 * | 2/2019 | Stevens | F23R 3/343 |

FOREIGN PATENT DOCUMENTS

| | | | |
|---|---|---|---|
| WO | WO2014/052221 A1 | 4/2014 | |
| WO | WO-2015147935 A1 * | 10/2015 | F23R 3/343 |

\* cited by examiner

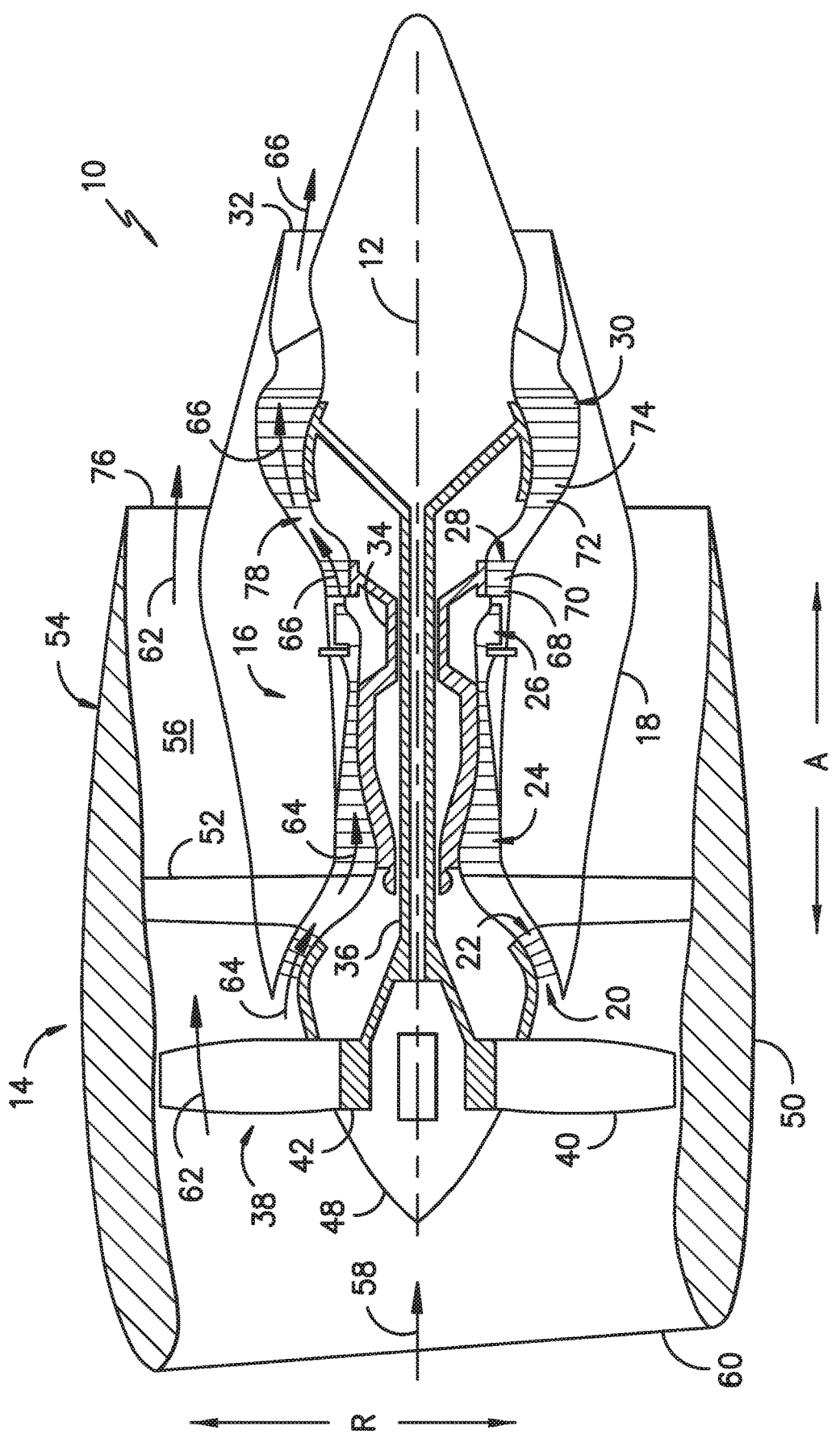
FIG. -1-

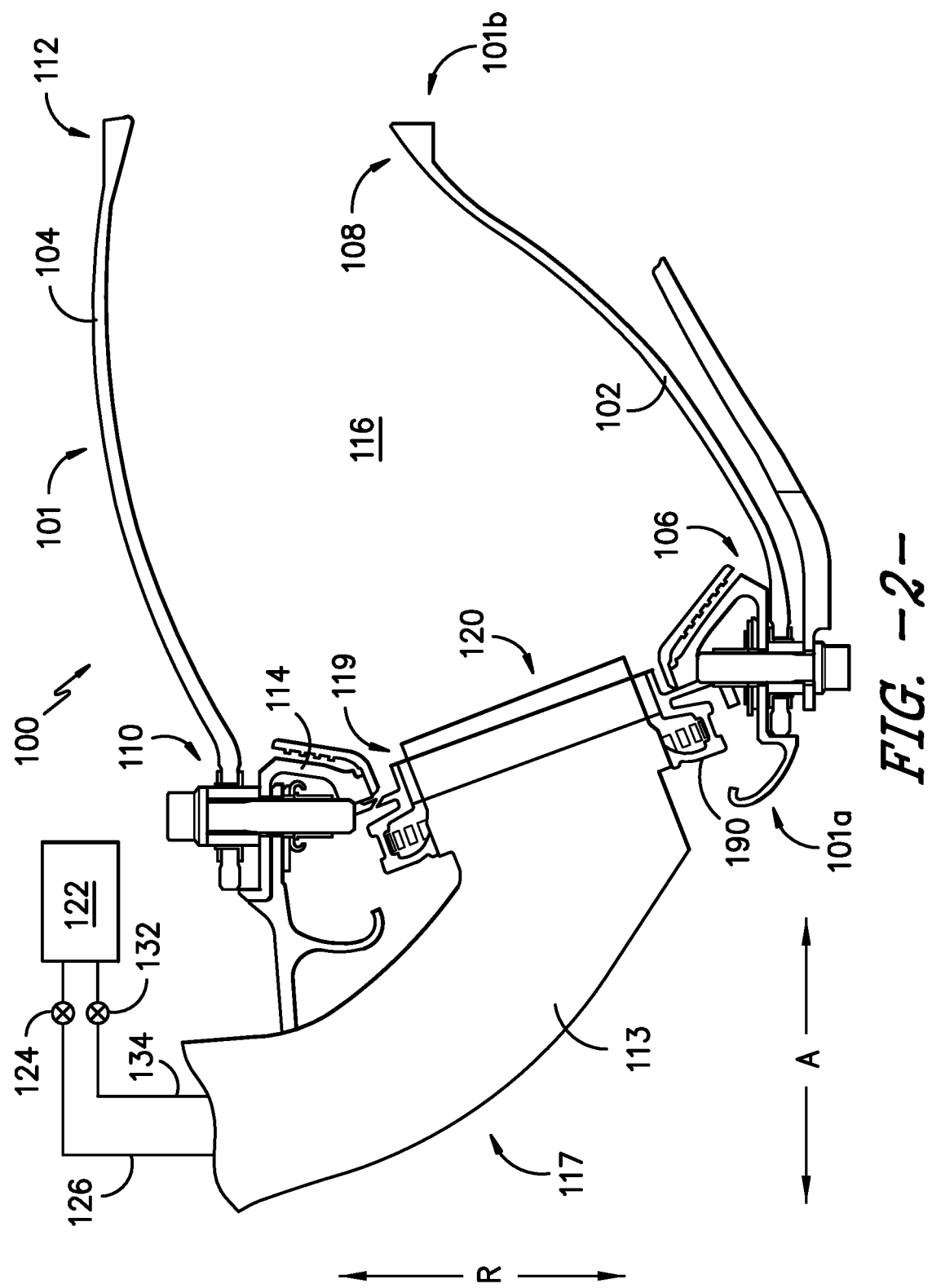
FIG. -2-

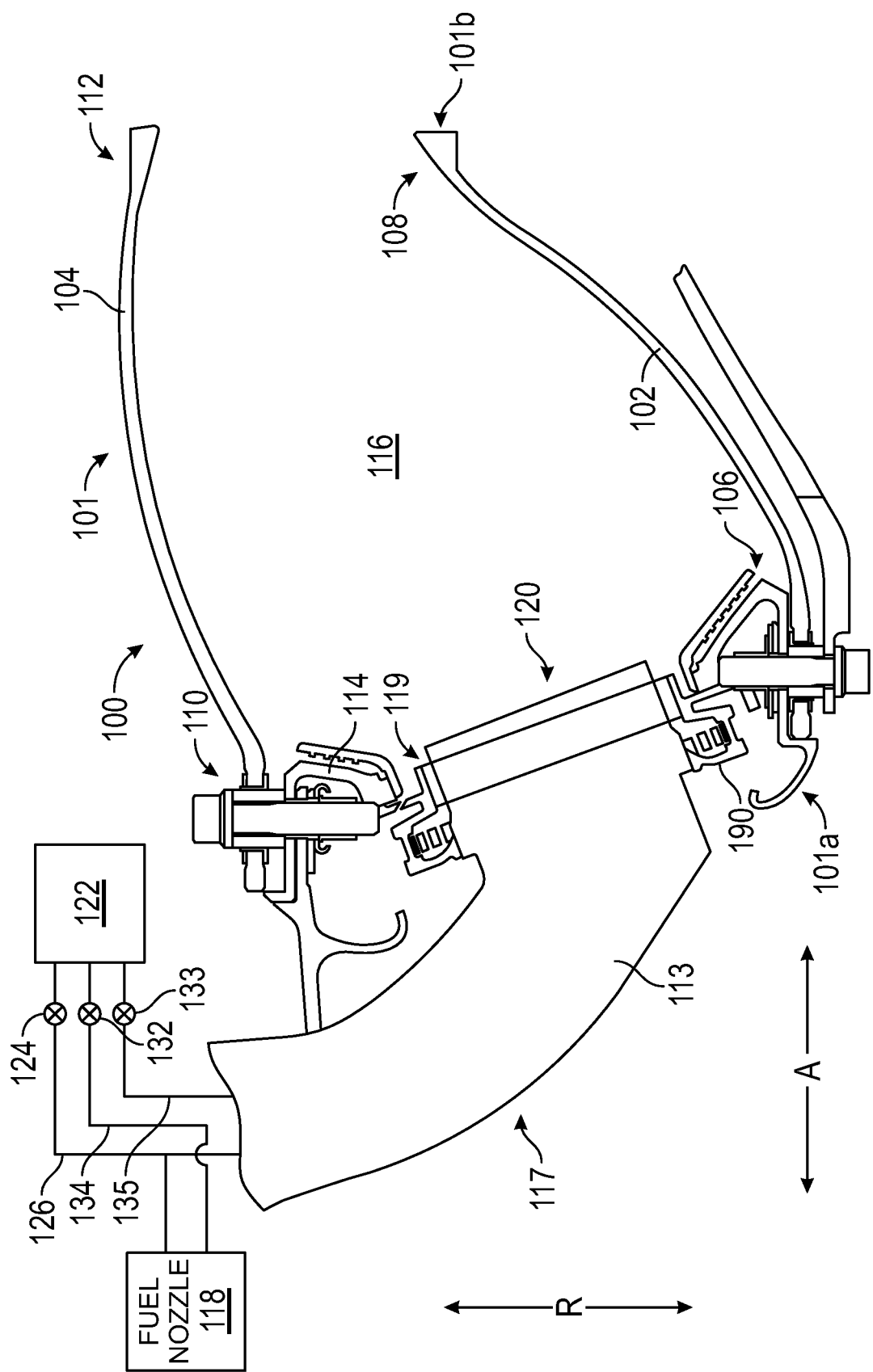
FIG. -3-

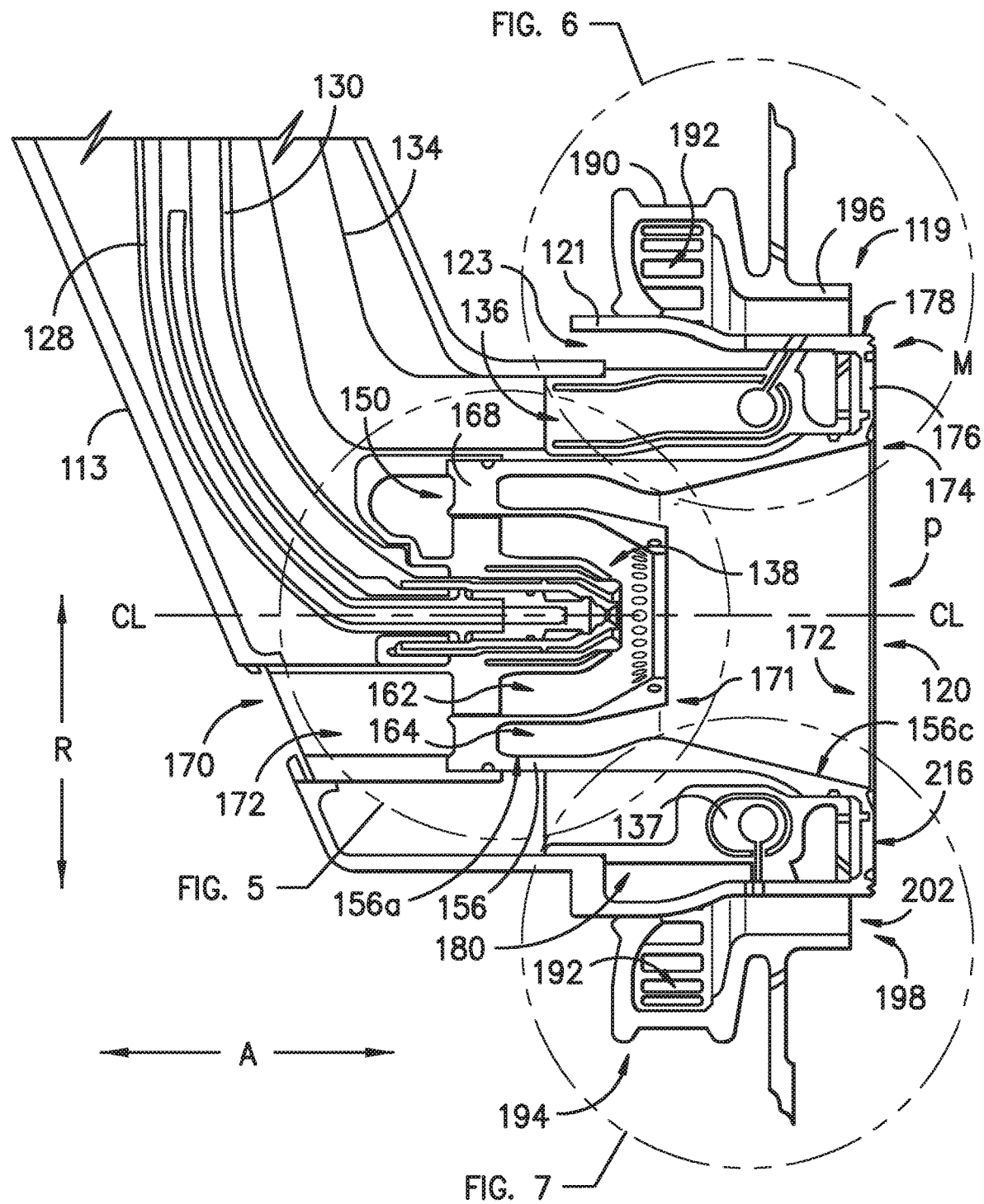
FIG. -4-

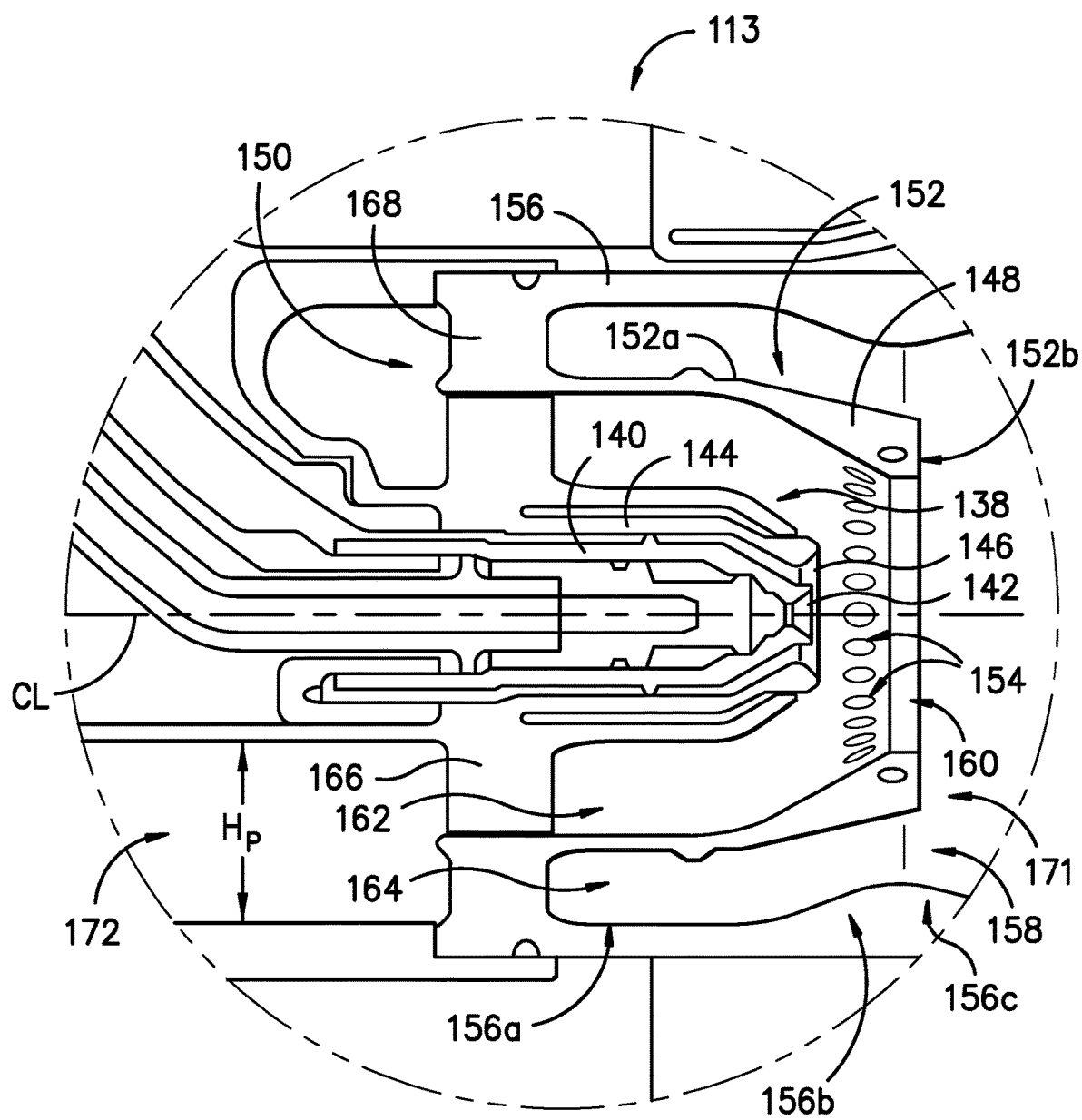
FIG. -5-

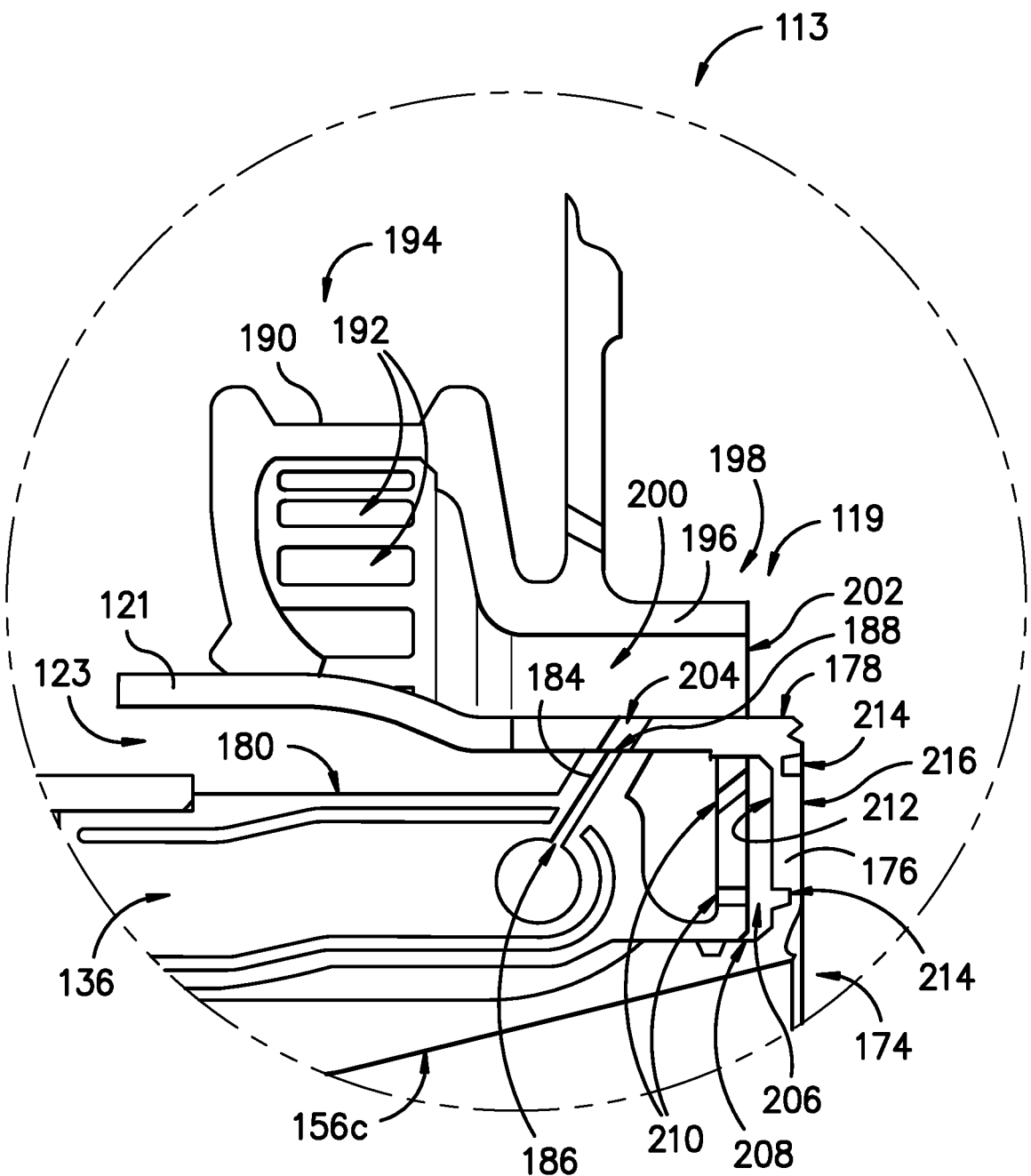
FIG. -6-

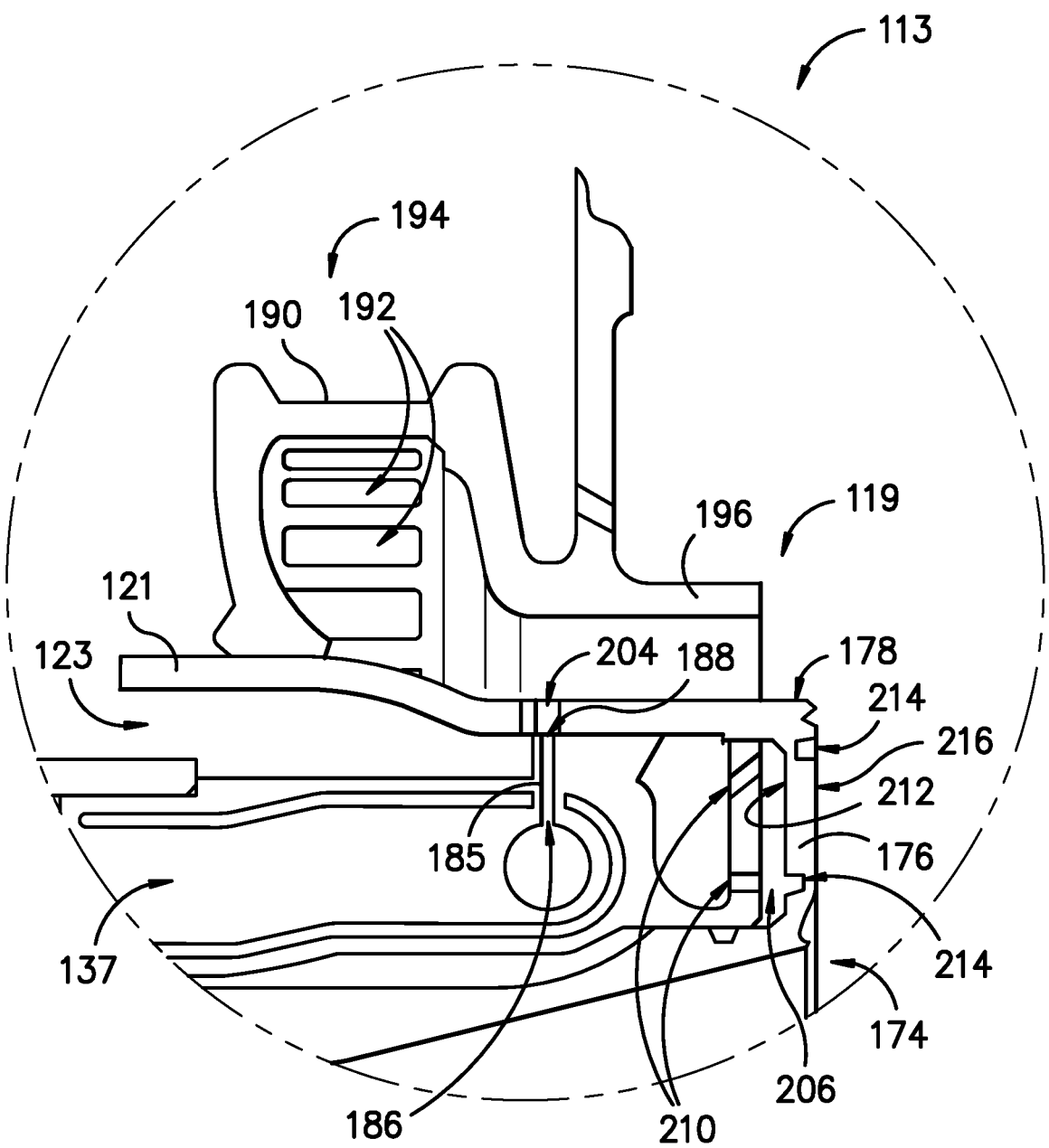
FIG. -7-

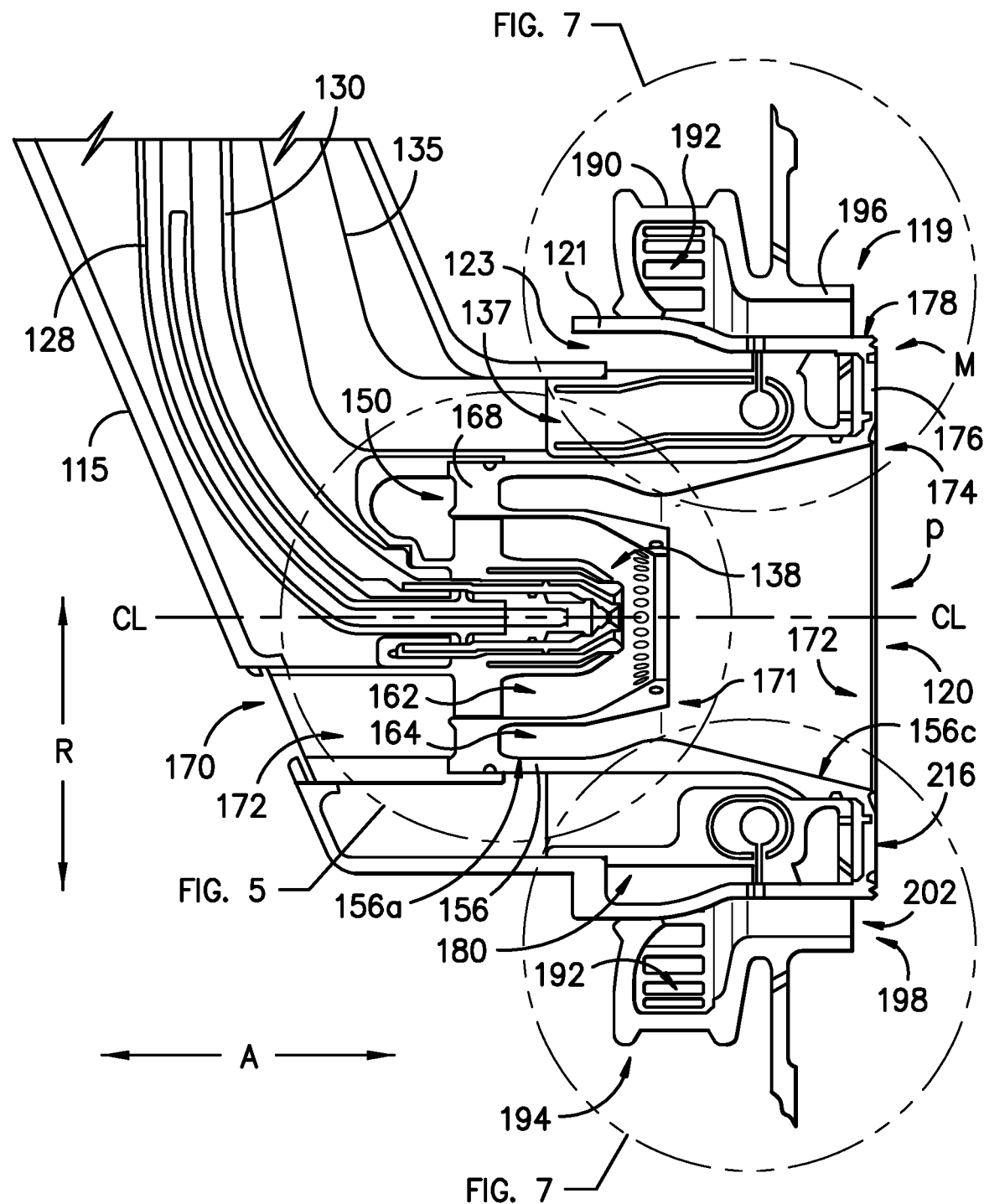
FIG. -8-

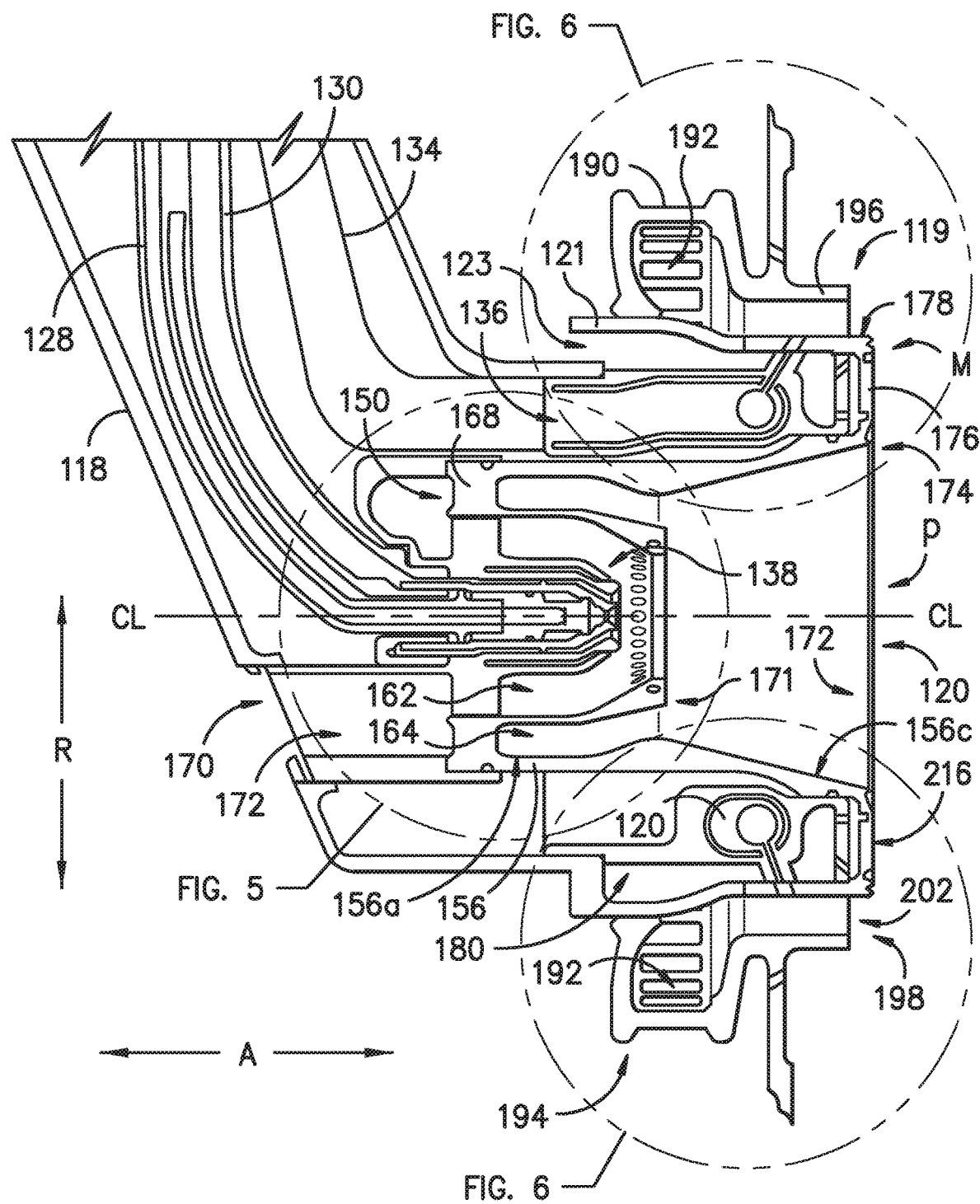
FIG. -9-

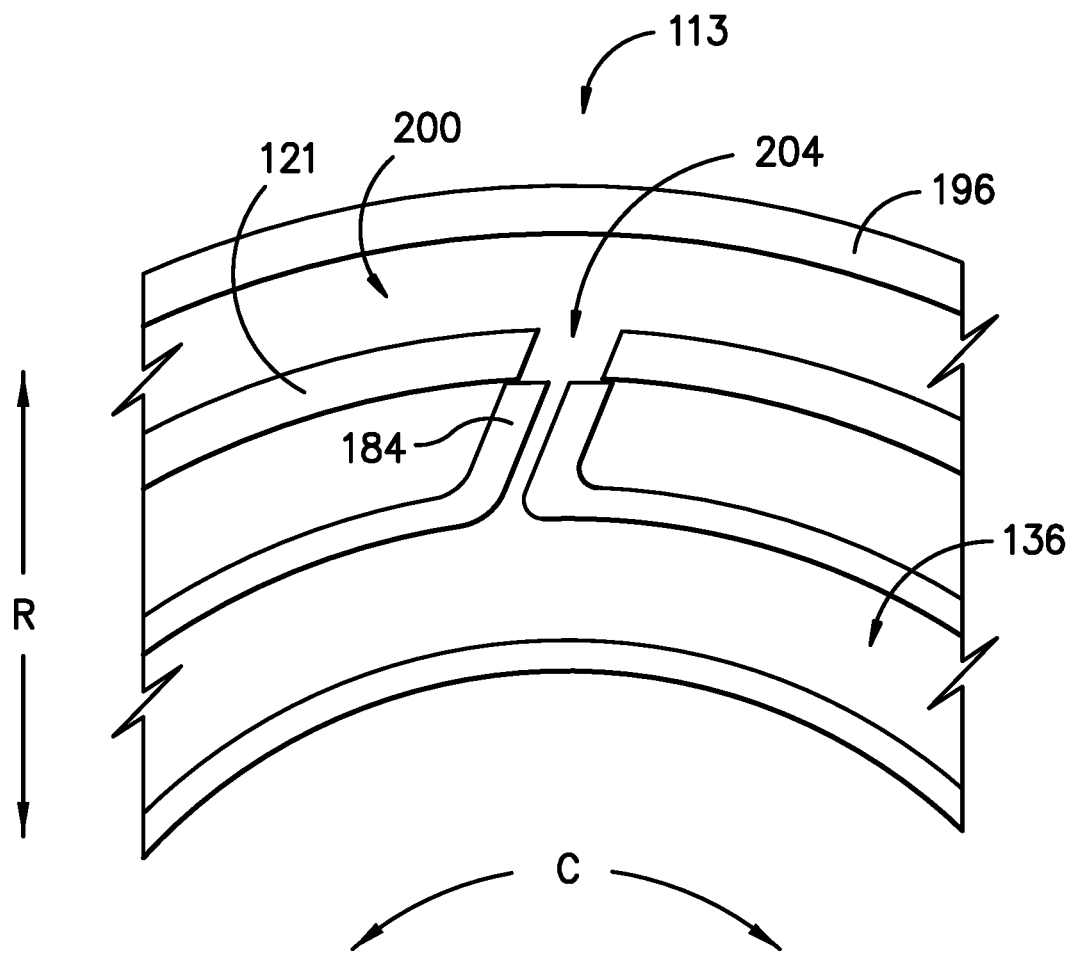
FIG. -10-

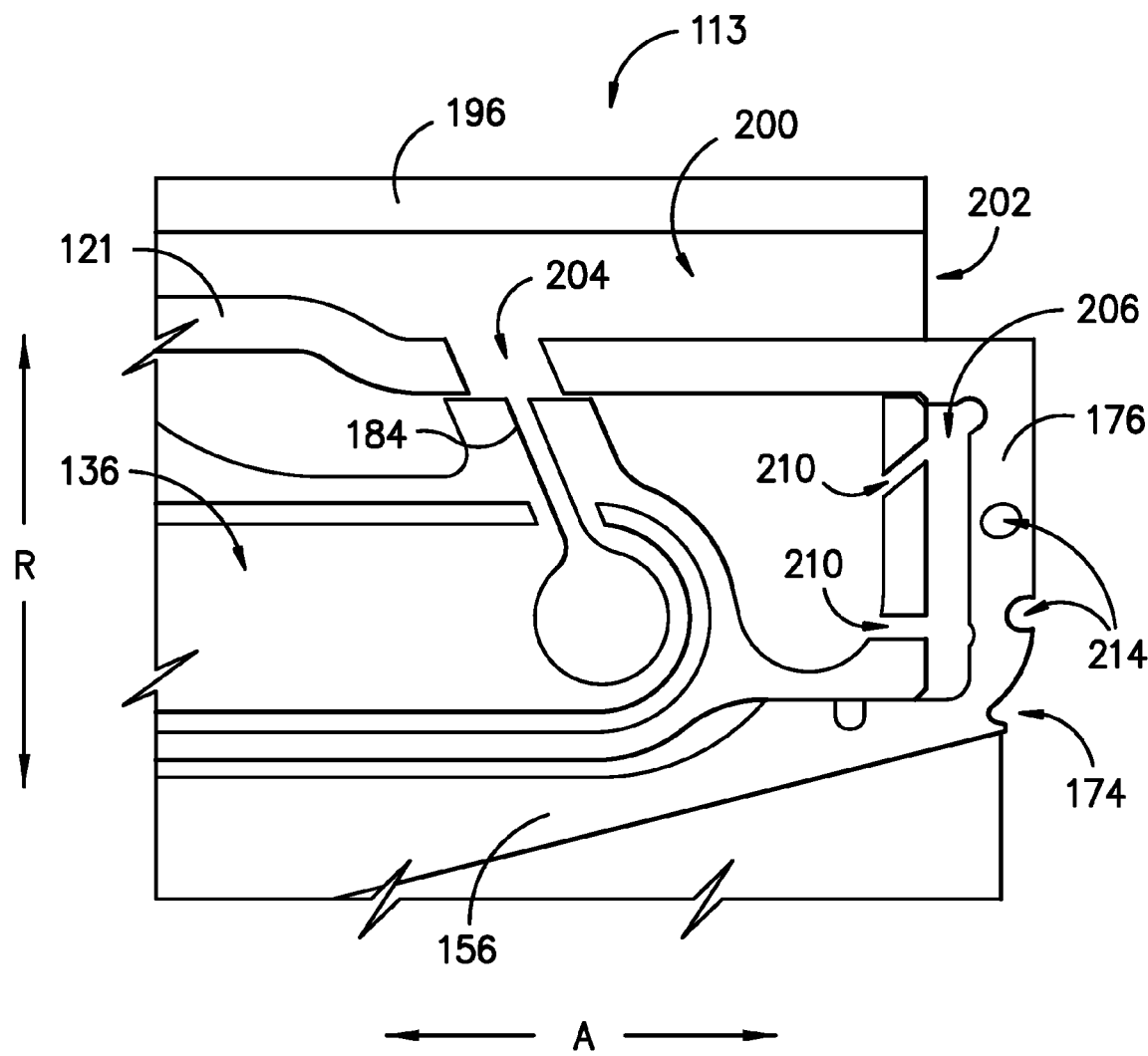
FIG. -11-

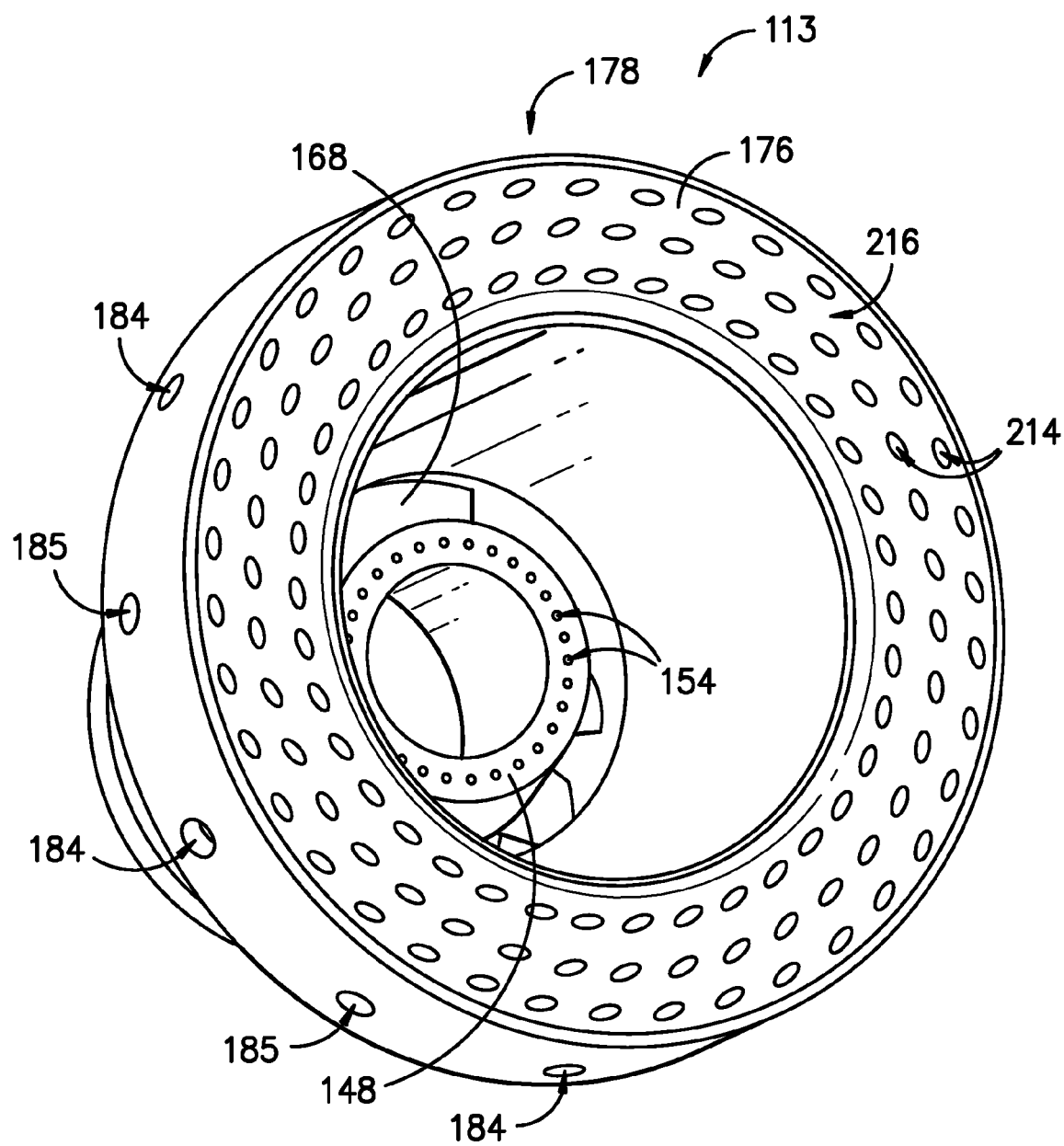
FIG. -12-

FUEL NOZZLE WITH ANGLED MAIN INJECTION PORTS AND RADIAL MAIN INJECTION PORTS

FEDERALLY SPONSORED RESEARCH

This invention was made with government support under contract number FA8650-07-C-2802 awarded by the U.S. Department of Defense. The government may have certain rights in the invention.

FIELD

The present subject matter relates generally to gas turbine engine combustor assemblies. More particularly, the present subject matter relates to combustor assembly structures affecting combustion dynamics.

BACKGROUND

Lean-burn combustor assemblies for gas turbine engines (e.g., propulsion engines for aircraft) are generally susceptible to undesirable combustion dynamics (e.g., acoustics, vibrations, and pressure oscillations resulting from heat release characteristics from combustion). Combustion dynamics may result in accelerated deterioration and wear of combustor assemblies and gas turbine engines, thus increasing maintenance and operational costs, reduced efficiencies and engine operability, and increase the risk of overall engine failure.

Thus, there is a need for a combustor assembly that mitigates undesired combustion dynamics.

BRIEF DESCRIPTION

Aspects and advantages of the invention will be set forth in part in the following description, or may be obvious from the description, or may be learned through practice of the invention.

The present disclosure is directed to a combustor system including a fuel nozzle comprising a main fuel injector defining an angled main injection port. Each angled main injection port defines an inlet end and an outlet end. The outlet end is oriented downstream relative to the inlet end at an angle relative to a centerline axis of the fuel nozzle. The angled main injection port permits egress of fuel from a main fuel circuit to the combustion chamber. The fuel nozzle further defines a radial main injection port. The outlet end is oriented along an axial direction approximately equal relative to the inlet end and radially outward thereof relative to the centerline axis. The radial main injection port is extended perpendicular relative to the centerline axis.

In various embodiments, the fuel nozzle defines an annular fuel nozzle outer wall radially spaced apart from an annular outer boundary wall surrounding a pilot fuel injector. The fuel nozzle outer wall defines an opening that permits a flow of air between the outer wall and the outer boundary wall. In one embodiment, the fuel nozzle defines an aperture through the outer wall, in which the aperture is defined in alignment with the angled main injection port and defines an angle with respect to the centerline axis approximately equal to the angle of the main injection port. In another embodiment, the fuel nozzle defines an aperture through the outer wall, in which the aperture is defined in alignment with the radial main injection port along a radial direction.

In still various embodiments, the fuel nozzle comprises a pilot fuel injector. The pilot fuel injector comprises an annular inner wall defining a primary fuel orifice and an annular outer wall defining a secondary fuel orifice. A primary pilot supply line supplies fuel through the primary fuel orifice and a secondary pilot supply line supplies fuel through the secondary fuel orifice. In one embodiment, the combustor system further includes a fuel system comprising a pilot control valve coupled to a pilot fuel conduit and operable to supply a flow of fuel thereto. The pilot fuel conduit is in fluid communication with the primary pilot supply line and the secondary pilot supply line. In another embodiment, the fuel system further includes a first main valve coupled to a first main fuel conduit and operable to supply a flow of fuel thereto. The first main fuel conduit is in fluid communication with a first main fuel circuit of the fuel nozzle.

In still various embodiments, the fuel nozzle defines a different volume or cross sectional area of the angled main fuel injection port, the inlet end, the outlet end, or combinations thereof relative to the radial main fuel injection port. In one embodiment, the combustor system defines a plurality of fuel nozzles disposed in adjacent circumferential arrangement, and wherein the plurality of fuel nozzles defines a first fuel nozzle defining the angled main fuel injection port and a second fuel nozzle defining the radial main fuel injection port. In another embodiment, the first fuel nozzle, the second fuel nozzle, and the fuel system together provide passive combustion dynamics attenuation defining a non-uniform flame structure and characteristic time given an approximately equal flow of fuel to the main injection port from the first main fuel circuit.

In still yet various embodiments, the fuel system further includes a first main valve coupled to a first main fuel conduit and operable to supply a flow of fuel thereto, wherein the first main fuel conduit is in fluid communication with a first main fuel circuit of the fuel nozzle; and a second main valve coupled to a second main fuel conduit and operable to supply a flow of fuel thereto independent of the first main fuel conduit, wherein the second main fuel conduit is in fluid communication with a second main fuel circuit of the fuel nozzle. In one embodiment, the combustor system defines a plurality of fuel nozzles disposed in adjacent circumferential arrangement, and wherein the plurality of fuel nozzles defines a first fuel nozzle defining the angled main fuel injection port and a second fuel nozzle defining the radial main fuel injection port. The first fuel nozzle, the second fuel nozzle, and the fuel system together provide active combustion dynamics attenuation defining a non-uniform flame structure and characteristic time given a variable pressure, flow, or temperature of fuel to the main injection port from the first main fuel circuit coupled to the first fuel nozzle and the second main fuel circuit coupled to the second fuel nozzle.

In one embodiment of the combustor system, the fuel nozzle further includes a pilot fuel injector in which each of the main fuel injector and the pilot fuel injector are configured to receive a portion of a fuel flow to each fuel nozzle.

Another aspect of the present disclosure is directed to a gas turbine engine including the combustor system. In various embodiments, the combustor system includes a fuel nozzle comprising a main fuel injector defining an angled main injection port, each angled main injection port defining an inlet end and an outlet end. The outlet end of the angled main injection port is oriented downstream relative to the inlet end at an angle relative to a centerline axis of the first fuel nozzle. The angled main injection port permits egress of fuel from a main fuel circuit to the combustion chamber. The fuel nozzle further defines a radial main injection port in which the outlet end is oriented along an axial direction approximately equal relative to the inlet end and radially outward thereof relative to the centerline axis. The radial main injection port is extended perpendicular relative to the centerline axis.

In various embodiments of the gas turbine engine, the engine further includes a fuel system comprising a pilot control valve coupled to a pilot fuel conduit and operable to supply a flow of fuel thereto. The pilot fuel conduit is in fluid communication with the primary pilot supply line and the secondary pilot supply line. In one embodiment, the fuel system further comprises a first main valve coupled to a first main fuel conduit and operable to supply a flow of fuel thereto, wherein the first main fuel conduit is in fluid communication with a first main fuel circuit of the fuel nozzle.

In still various embodiments of the gas turbine engine, the fuel nozzle defines a different volume or cross sectional area of the angled main fuel injection port, the inlet end, the outlet end, or combinations thereof relative to the radial main fuel injection port. In one embodiment, the combustor system defines a plurality of fuel nozzles disposed in adjacent circumferential arrangement. The plurality of fuel nozzles defines a first fuel nozzle defining the angled main fuel injection port and a second fuel nozzle defining the radial main fuel injection port. The first fuel nozzle, the second fuel nozzle, and the fuel system together provide passive combustion dynamics attenuation defining a non-uniform flame structure and characteristic time given an approximately equal flow of fuel to the main injection port from the first main fuel circuit.

In still various embodiments of the gas turbine engine, a first main valve is coupled to a first main fuel conduit and operable to supply a flow of fuel thereto. The first main fuel conduit is in fluid communication with a first main fuel circuit. A second main valve is coupled to a second main fuel conduit and operable to supply a flow of fuel thereto independent of the first main fuel conduit. The second main fuel conduit is in fluid communication with a second main fuel circuit. In one embodiment, the combustor system defines a plurality of fuel nozzles disposed in adjacent circumferential arrangement, and wherein the plurality of fuel nozzles defines a first fuel nozzle defining the angled main fuel injection port and a second fuel nozzle defining the radial main fuel injection port, and wherein the first fuel nozzle, the second fuel nozzle, and the fuel system together provide active combustion dynamics attenuation defining a non-uniform flame structure and characteristic time given a variable pressure, flow, or temperature of fuel to the main injection port from the first main fuel circuit coupled to the first fuel nozzle and the second main fuel circuit coupled to the second fuel nozzle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine according to various embodiments of the present subject matter.

FIG. 2 provides a schematic cross-section view of a combustor system of the gas turbine engine of FIG. 1, according to an exemplary embodiment of the present subject matter.

FIG. 3 provides a schematic cross-section view of a combustor system of the gas turbine engine of FIG. 1, according to another exemplary embodiment of the present subject matter.

FIG. 4 provides a schematic cross-section view of a fuel nozzle assembly of the combustor system of FIGS. 2-3, according to an exemplary embodiment of the present subject matter.

FIGS. 5, 6, and 7 provide enlarged views of segments of the fuel nozzle assembly illustrated in FIG. 4.

FIG. 8 provides a schematic cross-section view of a second fuel nozzle assembly of the combustor system of FIGS. 2-3, according to an exemplary embodiment of the present subject matter.

FIG. 9 provides a schematic cross-section view of a first fuel nozzle assembly of the combustor system of FIGS. 2-3, according to an exemplary embodiment of the present subject matter.

FIG. 10 provides a schematic cross-section view of a portion of a main fuel injector of a fuel nozzle assembly, according to an exemplary embodiment of the present subject matter.

FIG. 11 provides schematic cross-section view of a portion of a main fuel injector of a fuel nozzle assembly, according to another exemplary embodiment of the present subject matter.

FIG. 12 provides an aft end view of a portion of a fuel nozzle outlet, according to an exemplary embodiment of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure, referred to herein as "engine 10." As shown in FIG. 1, the engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of engine 10, additional spools may be provided such that engine 10 may be described as a multi-spool engine.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

FIG. 2 provides a schematic cross-sectional view of a combustor system 100, e.g., for use in the gas turbine engine of FIG. 1, according to an exemplary embodiment of the present subject matter. As shown in FIG. 2, the combustor system 100 comprises a combustor 101 having a forward end 101a and an aft end 101b. The combustor 101 further includes an annular inner liner 102 and an annular outer liner 104. The inner liner 102 extends generally along the axial direction A between an upstream end 106 and a downstream end 108. Similarly, the outer liner 104 extends generally along the axial direction A between an upstream end 110 and a downstream end 112. Each of the inner liner 102 and the outer liner 104 may be formed from a CMC material, as described in greater detail below, or from any other suitable material.

A combustor dome 114 extends generally along the radial direction R between the upstream end 106 of the inner liner 102 and the upstream end 110 of the outer liner 104. As shown in FIG. 2, the inner liner 102, the outer liner 104, and the combustor dome 114 define a combustion chamber 116 therebetween. In some embodiments, the combustor dome 114 is integral with the inner liner 102, i.e., the inner liner 102 and the combustor dome 114 are integrally formed as a single piece structure, but in other embodiments, the combustor dome 114 is integral with the outer liner 104, i.e., the outer liner 104 and the combustor dome 114 are integrally formed as a single piece structure. In still other embodiments, the combustor dome 114 is formed separately from the inner liner 102 and the outer liner 104, or in yet other embodiments, the combustor dome 114 is integral with both the inner and outer liners 102, 104, e.g., at least a first portion of the combustor dome 114 may be integral with the inner liner 102 and at least a second portion of the combustor dome 114 may be integral with the outer liner 104. The combustor dome 114 may be formed from any suitable material, e.g., a CMC material or a metallic material, such as a metal or metal alloy.

Further, the combustor system 100 includes a fuel nozzle assembly 117 having a plurality of fuel nozzles 113 each defining a fuel nozzle outlet 120 at an outlet end 119 of the fuel nozzle 113. In various embodiments, the combustor system 100 includes a first fuel nozzle 118 and a second fuel nozzle 115 each disposed in alternating circumferential arrangement around the longitudinal centerline 12. As will be discussed further below, the plurality of fuel nozzles 113 generally provided may provide a flame non-uniformity that may mitigate combustion dynamics. Furthermore, the flame non-uniformity may mitigate high cycle fatigue of the combustor system 100 or components thereof. In still various embodiments, the fuel nozzle 113 generally provided may reduce surface or internal temperatures of the inner liner 102, the outer liner 104, or both, thereby improving engine 10 durability.

Referring still to the combustor system 100, a main mixer 190 extends about the fuel nozzle outlet 120 as described in greater detail below. The fuel nozzle 113 is disposed through the combustor dome 114 such that the fuel nozzle outlet 120 is disposed at or adjacent the forward end 101a of the combustor 101 to direct a fuel-air mixture into the combustion chamber 116. More particularly, the exemplary fuel nozzle 113 is of a type configured to inject liquid or gaseous hydrocarbon fuel into an airflow stream of the combustor system 100. The fuel nozzle 113 is of a "staged" type, meaning it is operable to selectively inject fuel through two or more discrete stages, each stage being defined by individual fuel flowpaths within the fuel nozzle 113.

The fuel flowrate may be variable within each of the stages. In the exemplary embodiment depicted in FIG. 2, the fuel nozzle 113 is connected to a fuel system 122 that is operable to supply a flow of liquid or gaseous fuel (or combinations thereof) at varying flowrates according to operational need. The fuel system 122 supplies fuel to a pilot control valve 124 that is coupled to a pilot fuel conduit 126, which in turn supplies fuel to a primary pilot supply line 128 and a secondary pilot supply line 130 (FIG. 4, FIG. 8-9) within the fuel nozzle 113.

In one embodiment of the combustion system 100, such as generally provided in FIG. 2, the fuel system 122 supplies fuel to a first main valve 132 that is coupled to a first main fuel conduit 134, which in turn supplies a first main fuel circuit 136 (FIG. 4, FIG. 9) and a second main fuel circuit 137 (FIG. 4, FIG. 8) of a first fuel nozzle 118 and a second fuel nozzle 115, respectively, of the plurality of fuel nozzles 113.

In another embodiment of the combustion system 100, such as generally provided in FIG. 3, the fuel system 122 supplies fuel to a second main valve 133 that is coupled to a second main fuel conduit 135, which in turn supplies the second main fuel circuit 137 (FIG. 8) of the second fuel nozzle 115. The first main valve 132 is coupled to the first main fuel conduit 134, which in turn supplies the first main fuel circuit 136 (FIG. 4) of the first fuel nozzle 118. As such, a flow, pressure, or temperature of fuel to the first fuel nozzle 118 may be independently adjustable relative to the second fuel nozzle 115.

The independent adjustability of the flow, pressure, or temperature of the fuel to the first fuel nozzle 118 versus the second fuel nozzle 115, in combination with the varying geometries of a fuel injection port 184 of each fuel nozzle 113 (e.g., FIGS. 10-11), enables fuel modulation between the two that may mitigate combustion dynamics. Furthermore, the independent adjustability may reduce inner liner 102 or outer liner 104 temperature, improve fuel/air mixing, reduce auto-ignition of the fuel, or combinations of these benefits. Additionally, independent adjustability may enable control or adjustability of combustion pattern factor (i.e., variations in temperature around the annulus of the combustion chamber 116).

Referring now to FIG. 4, a cross-section view is provided of a portion of the fuel nozzle assembly 117. Additionally, FIGS. 5, 6, and 7 provide enlarged views of segments of a portion of the fuel nozzle 113 illustrated in FIG. 4. For purposes of description, reference will be made to a centerline axis CL of the fuel nozzle assembly 117. In some embodiments, the centerline axis CL is generally parallel to the axial centerline 12 of the engine 10, but in other embodiments, the centerline axis CL may be at an angle relative to the engine axial centerline 12. The components of the illustrated fuel nozzle assembly 117 are disposed extending parallel to and surrounding the centerline axis CL, generally as a series of concentric rings. For instance, a pilot fuel injector 138 is disposed at or near the outlet 120 of the fuel nozzle 113 and is aligned with the centerline axis CL. As shown most clearly in FIG. 5, the pilot fuel injector 138 includes a generally annular inner wall 140 that defines a primary fuel orifice 142 and a generally annular outer wall 144 that defines a secondary fuel orifice 146. The primary pilot supply line 128 supplies fuel to the fuel nozzle 113 through the primary fuel orifice 142, and the secondary pilot supply line 130 supplies fuel to the fuel nozzle 113 through the secondary fuel orifice 146.

As shown in FIGS. 4 and 5, the inner wall 140 is disposed radially inward with respect to the outer wall 144 such that the outer wall 144 generally surrounds the inner wall 140 and the secondary fuel orifice 146 surrounds the primary fuel orifice 142. Further, in the depicted embodiment, the primary fuel orifice 142 generally is radially aligned with the secondary fuel orifice 146. That is, the primary and secondary fuel orifices 142, 146 are disposed generally at the same axial location within the fuel nozzle 113.

An annular pilot splitter 148 circumferentially surrounds the pilot fuel injector 138. The pilot splitter 148 includes an upstream portion 150 and a downstream portion 152. The upstream portion 150 generally is cylindrical in shape, while the downstream portion 152 generally is conical in shape. The downstream portion 152 generally is converging with respect to the centerline axis CL, having a wider first section 152a that gradually diminishes to a narrower second section 152b, where the second section 152b is downstream with respect to the first section 152a. A plurality of apertures 154 are defined in the second section 152b, e.g., the plurality of splitter apertures 154 may be defined along the circumference of the second section 152b and generally may be evenly spaced apart from one another. The splitter apertures 154 permit a flow of air therethrough, e.g., to enhance cooling of the pilot splitter 148 and thereby improve the splitter's durability. The flow of air is described in greater detail below.

An annular outer boundary wall 156 circumferentially surrounds the pilot splitter 148 and defines the outer boundary of a pilot portion P of the fuel nozzle 118. The outer boundary wall 156 includes a generally cylindrical first portion 156a, a converging second portion 156b, and a diverging third portion 156c, such that a throat 158 is defined between the second and third portions 156b, 156c. As shown in FIG. 5, the first, second, and third portions 156a, 156b, 156c are axially arranged in flow order, i.e., the first portion 156a is upstream of the second portion 156b, which is upstream of the third portion 156c. Further, the converging second portion 156b of the outer boundary wall 156 generally follows or is parallel to the converging downstream portion 152 of the pilot splitter 148. As such, a downstream end 160 of the pilot splitter 148 is disposed generally within the throat 158 defined by the converging and diverging portions 156b, 156c of the outer boundary wall 156.

As illustrated in FIGS. 4 and 5, an inner air circuit 162 is defined between the pilot fuel injector 138 and the pilot splitter 148, and an outer air circuit 164 is defined between the pilot splitter 148 and the outer boundary wall 156. A circumferential array of inner swirl vanes 166 radially extends from the pilot fuel injector 138 to the upstream portion 150 of the pilot splitter 148. Similarly, a circumferential array of outer swirl vanes 168 radially extends from the upstream portion 150 of the pilot splitter 148 to the first portion 156a of the outer boundary wall 156. The inner swirl vanes 166 are shaped and oriented to induce a swirl into air flow passing through the inner air circuit 162, and the outer swirl vanes 168 are shaped and oriented to induce a swirl into air flow passing through the outer air circuit 164.

Upstream of the inner and outer air circuits 162, 164, the fuel nozzle 113 defines a pilot air inlet 170 that permits ingress of air into the pilot portion P. The air flows into a pilot airflow passage 172, which is split into the inner air circuit 162 and the outer air circuit 164 by the pilot splitter 148. At the downstream end 160 of the pilot splitter 148, the inner and outer air circuits 162, 164 merge back into the single pilot airflow passage 172, which extends through the remainder of the pilot portion P of the fuel nozzle 113. As shown in FIG. 4, the third portion 156c of the outer boundary wall 156 defines the outer boundary of the airflow passage 172 through the downstream end of the pilot portion P. The inner air circuit 162 and outer air circuit 164, including inner and outer swirl vanes 166, 168, and the third portion 156c of the outer boundary wall 156 form a pilot swirler 171. The pilot swirler 171 directs and controls the fluid flow, including the flow of air and the mixture of air and fuel, through the pilot portion P of the fuel nozzle 113. More particularly, the air swirls through the inner and outer swirl vanes 166, 168 and then expands as it is mixed with fuel in the generally conically shaped downstream portion of the pilot swirler 171 defined by the outer boundary wall third portion 156c.

Referring still to FIG. 4, a downstream end 174 of the outer boundary wall 156 may include a heat shield 176 that is configured as an annular, radially-extending plate. A thermal barrier coating (TBC) of a known type may be applied on all or a portion of the surface of the heat shield 176 and/or the outer boundary wall 156, e.g., to help protect the components from the damaging effects of high temperatures. The heat shield 176 is described in greater detail below.

Further, the fuel nozzle 113 circumferentially surrounds the pilot portion P. In particular, an outer wall 121 of the fuel nozzle 113 defines the fuel nozzle outlet 120 and extends axially to a radially outermost end 178 of the heat shield 176. As illustrated in FIG. 4, the outer wall 121 is radially spaced apart from the outer boundary wall 156. Additionally, the outer wall 121 defines an opening 123 that permits a flow of air into the space between the outer wall 121 and the outer boundary wall 156. The flow of air may provide cooling to the fuel nozzle heat shield 176.

The pilot fuel injector 138 defines a relatively small, stable pilot flame or burn zone. The pilot burn zone is centrally located within the annular combustor flow field in a radial sense. Fuel is supplied to the pilot fuel injector 138 via the primary and secondary pilot supply lines 128, 130. Air is supplied through the pilot airflow passage 172. The pilot airflow passage 172 provides a relatively high airflow; stated differently, the portion of the total combustor airflow directed through the pilot airflow passage 172 is relatively high, particularly compared to known combustor designs. The airflow to and through the pilot portion P is described in greater detail below.

Continuing with FIG. 4, an annular main portion M extends circumferentially about the annular pilot portion P of the fuel nozzle 113. The main portion M includes a main fuel injector 180, which is supplied with fuel through a main fuel circuit 136. The main fuel circuit 136 is coupled to and supplied with fuel by the main fuel conduit 134.

As illustrated in FIGS. 4, 6, 7, 8, and 9, the main fuel injector 180 includes a plurality of injection ports 184. As generally provided in FIG. 4, the fuel nozzle 113 defines an angled main fuel injection port 184 angled downstream with respect to the centerline axis CL of the fuel nozzle assembly 117. The fuel nozzle 113 further defines a radial main fuel injection port 185 that is defined generally straight along the radial direction R relative to the centerline axis CL (e.g., perpendicular to the centerline axis CL). Each of the angled fuel injection ports 184 and radial fuel injection ports 185 are disposed in alternating arrangement through the main fuel injector 180. For example, the angled fuel injection port 184 may define every one port, alternating with each radial fuel injection port 185. As another example, the angled fuel injection port 184 may define several ports in adjacent circumferential arrangement followed by several ports in adjacent circumferential arrangement of the radial fuel injection port 185.

Each angled main injection port 184 of the fuel nozzle 113 has an inlet end 186 and an outlet end 188, and the outlet end 188 is oriented downstream with respect to the inlet end 186 and at an angle with respect to the centerline axis CL. The inlet end 186 permits ingress of fuel from the main fuel circuit 136 into the angled injection port 184, and the outlet end 188 permits egress of fuel from the injection port 184. As such, the angled injection ports 184 of the fuel nozzle 113 permit the egress of fuel from the main fuel circuit 136 toward the center of the combustion chamber 116 as described in greater detail below.

In the embodiment generally provided in FIG. 7, the fuel nozzle 113 further defines a straight radial main fuel injection port 185 that is defined straight along the radial direction R from the centerline axis CL (e.g., perpendicular to the centerline axis CL). That is, each radial injection port 185 of the fuel nozzle 113 has an inlet end 186 and an outlet end 188, and the outlet end 188 is oriented along the axial direction A approximately equal with respect to the inlet end 186 and radially outward thereof with respect to the centerline axis CL.

The fuel nozzle assembly 117 further includes an annular main mixer or swirler 190 that circumferentially surrounds the fuel nozzle 113 adjacent the main fuel injector 180. The main mixer 190 defines a plurality of inlet apertures 192 about its circumference to permit airflow into the main mixer 190. As shown in FIGS. 4, 6, 7, 8, and 9, the main mixer inlet apertures 192 are defined at a forward or upstream end 194 of the main mixer 190. In some embodiments, the main mixer 190 and its inlet apertures 192 may be shaped and/or oriented to induce a swirl into air flow passing through the main mixer 190. Downstream or aft of the apertures 192, the main mixer 190 includes an annular main mixer wall 196 that extends to an aft or downstream end 198 of the main mixer 190 and that is radially spaced apart from the outer wall 121 of the fuel nozzle 113. A main airflow passage 200 is defined between the main mixer wall 196 and the fuel nozzle outer wall 121. Further, the main mixer wall 196 defines a main mixer outlet 202 at the downstream end 198. As such, air flows into the main mixer 190 through the inlet apertures 192, continues through the main airflow passage 200, and exits the main mixer 190 through the main mixer outlet 202. The main mixer 190 provides a relatively low airflow; stated differently, the portion of the total combustor airflow directed through the main mixer 190 is relatively low, particularly compared to known combustor designs. The airflow to and through the main portion M is described in greater detail below.

As also illustrated in FIGS. 4, 6, and 7, the fuel nozzle outer wall 121 defines an aperture 204 therein that is aligned with the injection port 184, 185. It will be appreciated that the outer wall 121 defines a plurality of apertures 204 that are each aligned with one of the injection ports 184, 185. As previously stated, the angled injection ports 184 of the fuel nozzle 113 are angled downstream with respect to the centerline axis CL of the fuel nozzle 113. The outer wall apertures 204 similarly are defined at an angle with respect to the centerline axis CL; the angle of the apertures 204 may be substantially the same as the angle of the angled injection ports 184 as shown in the exemplary embodiment of FIGS. 4 and 6. Moreover, the outer wall apertures 204 are defined downstream of the inlet apertures 192, such that the fuel is injected within the main airflow passage 200 defined between the main mixer wall 196 and the fuel nozzle outer wall 121. Accordingly, the fuel mixes in the main airflow passage 200 with the airflow introduced into the main mixer 190 through the main mixer apertures 192, and the fuel-air mixture continues to flow downstream and exits the main mixer 190 into the combustion chamber 116 through the main mixer outlet 202. As previously described, the angled injection ports 184 and outlet wall apertures 204 help direct the fuel toward the middle of the combustor 101, such that the fuel within the combustor is more concentrated toward a center of the combustor. As such, the angled fuel injection may help control the profile and/or pattern factor of the combustor 101, as well as allow a higher power operation of the engine and increase the durability of the inner and outer liners 102, 104 and other combustor hardware by directing the fuel and combustion gases away from the combustor hardware.

In other embodiments, the angled injection ports 184 may be angled in or along other directions. For example, referring to FIG. 10, the angled injection ports 184 are angled circumferentially around the fuel nozzle 118, i.e., generally extending along the radial direction R but also along the circumferential direction C as well as either upstream or downstream along the axial direction A. As such, the angled injection ports 184 generally are aligned with the swirl direction of the main mixer 190 or are perpendicular to the swirl direction of main mixer 190. As another example, illustrated in FIG. 11, the angled injection ports 184 are angled upstream, rather than downstream as depicted in FIGS. 4, 6, and 7. That is, the outlet end 188 of each angled injection port 184 is oriented upstream with respect to the inlet end 186 and at an angle with respect to the centerline axis CL. It will be appreciated that, as shown in FIGS. 6 and 7, the outer wall apertures 204 are defined to align with the angled injection ports 184, no matter the orientation of the angled injection ports 184.

Further, it will be understood that the angled injection ports 184 have an orientation that is not purely or solely radial, axial, or circumferential but, rather, comprises at least two directional components. In other words, because the ports 184 are angled, each injection port 184 does not extend along only the radial direction R, the axial direction A, or the circumferential direction C but extends, to some extent, along at least two directions. For example, referring to FIGS. 4 and 6, the orientation of angled injection ports 184 has a radial component as well as an axial component. That is, while each angled injection port 184 of the depicted embodiment extends primarily radially, the injection ports 184 are angled downstream such that the ports 184 also extend in the downstream axial direction A. In the embodiment of FIG. 10, the fuel injection ports 184 extend in the radial direction R, circumferential direction C, and axial direction A, and in the embodiment of FIG. 11, the angled injection ports 184 extend radially as well as in the upstream axial direction A.

Referring still to FIG. 4, as well as the detailed view provided in FIG. 7, a radial main injection port 185 of the fuel nozzle 113, including the inlet end 186 and the outlet end 188, is disposed in the radial direction extended from the reference centerline axis CL. The fuel nozzle outer wall 121 defines the aperture 204 therein that is aligned with the radial injection port 185 along the radial direction R. It will be appreciated that the outer wall 121 defines a plurality of apertures 204 that are each aligned with one of the radial injection ports 185. As previously stated, the radial injection ports 185 of the fuel nozzle 113 are disposed straight along the radial direction R (i.e., perpendicular) with respect to the centerline axis CL of the fuel nozzle 113. The outer wall apertures 204 similarly are defined straight with respect to the centerline axis CL. Moreover, the outer wall apertures 204 are defined downstream of the inlet apertures 192, such that the fuel is injected within the main airflow passage 200 defined between the main mixer wall 196 and the fuel nozzle outer wall 121. Accordingly, the fuel mixes in the main airflow passage 200 with the airflow introduced into the main mixer 190 through the main mixer apertures 192, and the fuel-air mixture continues to flow downstream and exits the main mixer 190 into the combustion chamber 116 through the main mixer outlet 202. As previously described, the combination of the straight radial injection ports 185 (FIG. 7) and the angled injection ports 184 (FIG. 6) and their respective outlet wall apertures 204 help provide non-uniform flame structure and characteristics around the annulus of the combustion chamber 116 such as to de-couple the heat release and pressure oscillations, thereby mitigating combustion dynamics.

In another embodiment of the combustion system 100, the plurality of fuel nozzles 113 defines a first fuel nozzle 118 and a second fuel nozzle 115 in circumferential arrangement in the combustion system 100. The first fuel nozzle 118, such as generally provided in FIG. 9, defines the angled main fuel injection port 184 through the main fuel injection 180 structure. The second fuel nozzle 115, such as generally provided in FIG. 8, defines the radial main fuel injection port 185 through the main fuel injection 180 structure. The embodiments of the first fuel nozzle 118 and the second fuel nozzle 115 generally provided may be configured substantially similarly to the fuel nozzle 113 described in regard to FIGS. 4-7, and FIGS. 10-11. For example, identical numerals or reference numbers indicated in regard to the fuel nozzle 113, and descriptions and embodiments thereof, are the same elements throughout the figures in regard to the first fuel nozzle 118 and the second fuel nozzle 115.

The first fuel nozzle 118 defining the angled main injection port 184 (e.g., shown and described in regard to FIGS. 4, 6, and 9) and the second fuel nozzle 115 (e.g., shown in FIGS. 7 and 8) defining the straight radial main injection port 185, in which the first fuel nozzle 118 and the second fuel nozzle 115 are together in alternating circumferential arrangement around the longitudinal centerline 12 of the engine 10, produces a non-uniform flame structure and characteristic when fuel egresses from each main injection port 184 such as to mitigate undesired combustion dynamics. The non-uniform flame produced by the alternating arrangement of the first fuel nozzle 118 and the second fuel nozzle 115 de-couples the heat release oscillation from pressure oscillations, thereby mitigating undesired combustion dynamics (e.g., vibrations, acoustics, noise, etc.).

The plurality of the fuel nozzle 113, as well as the combination of the first fuel nozzle 118 and the second fuel nozzle 115, with the fuel system 122 as described in regard to FIG. 2 may provide generally passive combustion dynamics attenuation, in which the alternation of the angled main injection port 184 and the straight radial main injection port 185 provides non-uniform flame structures and characteristic times given an approximately equal flow of fuel to each main injection port 184, 185 of each fuel nozzle 113. Furthermore, the angled main injection port 184, the radial main injection port 185, the inlet end 186, the outlet end 188, the outer wall apertures 204, or combinations thereof of the fuel nozzle 113 may define different volumes between one another. As another example, the angled main fuel injection port 184 of the first fuel nozzle 118 may define a different volume or cross sectional area in contrast to the radial main fuel injection port 185 of the second fuel nozzle 115 such as to provide a different pressure and flow rate of fuel through the main injection port 184, 185 to the main airflow passage 200.

In another embodiment, the plurality of fuel nozzles 113, as well as the combination of the first fuel nozzle 118 and the second fuel nozzle 115, with the fuel system 122 as described in regard to FIG. 3 may provide generally active combustion dynamics attenuation, in which the alternation of the angled main injection port 184 and the straight radial main injection port 185, in addition to variable flow, pressure, or temperatures of the fuel to each fuel nozzle 113, provides non-uniform flame structures and characteristic times.

As previously described, the exemplary fuel nozzle 113 includes a heat shield 176 that is configured as an annular, radially-extending plate, as most clearly shown in FIG. 12. The heat shield area, which extends between the pilot portion P and main portion M of the fuel nozzle assembly 117, is a stabilization zone for the combustion reaction. That is, hot combustion gases cross between the pilot portion P and the main portion M to stabilize the reaction and keep the fuel burning properly. Thus, the hot gases are transported across the aft or outlet end 119 of the fuel nozzle 113 and the heat shield 176 helps to protect the outlet end 119 of the fuel nozzle 113.

As depicted in FIGS. 4 and 6-9, the exemplary heat shield 176 incorporates features for improving the durability of the heat shield, as it is exposed to the hot combustion gases. For instance, a radially sealed cavity 206 is formed between the heat shield 176 and an aft end 208 of the main fuel circuit 136. The cavity 206 receives a flow of air through apertures 210 defined in the aft end 208 of the main fuel circuit 136. More particularly, airflow through the opening 123 defined by the fuel nozzle outer wall 121 may flow downstream within the space between the fuel nozzle outer wall 121 and the outer boundary wall 156 of the fuel nozzle pilot portion P. The airflow may continue through the apertures 210 and into the cavity 206 between the main fuel circuit 136 and the heat shield 176. Further, the airflow into the cavity 206 may impinge on a forward surface 212 of the heat shield 176, which may help cool the heat shield 176.

Moreover, as shown particularly in FIG. 12, the heat shield 176 defines one or more apertures 214 therein, through which the air may flow from the cavity 206 to an aft surface 216 of the heat shield 176. The heat shield apertures 214 may be angled, e.g., generally defined as passages swirling into and out of the page in the schematic depictions of FIGS. 4, 8, and 9, to lay a film of air along the aft surface 216 of the heat shield 176 and thereby help cool the aft surface 216. That is, cooling flow provided through heat shield apertures 214 may be swirled to complement the airflow local to the heat shield 176, which may create a more effective cooling film on the aft surface 216 of the heat shield 176 without disrupting the flame stabilization zone. The combination of impingement and film cooling improves the durability of the heat shield 176, which is exposed to hot combustion gases as described above. Additionally or alternatively, the heat shield apertures 214 may be shaped to reduce an exit velocity of the cooling flow, as well as to further improve film cooling of the heat shield 176. Further, a radial compound angle may be employed to cool the radially outermost end 178 of the heat shield 176. The heat shield 176 also may incorporate other features for cooling the heat shield and improving its durability.

The fuel nozzle 113 and its constituent components, as well as the main mixer 190, may be constructed from one or more metallic alloys. Non-limiting examples of suitable alloys include nickel and cobalt-based alloys. All or part of the fuel nozzle 113 or portions thereof may be part of a single unitary, one-piece, or monolithic component, and may be manufactured using a manufacturing process that involves layer-by-layer construction or additive fabrication (as opposed to material removal as with conventional machining processes). Such processes may be referred to as "rapid manufacturing processes" and/or "additive manufacturing processes," with the term "additive manufacturing process" generally referring herein to such processes. Additive manufacturing processes include, but are not limited to: Direct Metal Laser Melting (DMLM); Laser Net Shape Manufacturing (LNSM); electron beam sintering; Selective Laser Sintering (SLS); 3D printing, such as by inkjets and laserjets; Stereolithography (SLA); Electron Beam Melting (EBM); Laser Engineered Net Shaping (LENS); and Direct Metal Deposition (DMD). Other additive or non-additive manufacturing processes may be used as well.

As previously stated, the pilot flow passage 172, or the pilot swirler 171, provides a relatively high airflow while the main mixer 190 provides a relatively low airflow. In some embodiments, the pilot swirler 171 provides an airflow of greater than about 14% $W_{36}$, where $W_{36}$ is the total combustor airflow or total airflow into the combustor system 100. In particular embodiments, the pilot swirler 171 provides an airflow between about 15% $W_{36}$ to about 40% $W_{36}$, but the pilot swirler 171 may provide a different amount of airflow as well. On the other hand, the main mixer 190 provides an airflow of less than about 50% $W_{36}$. In particular embodiments, the main mixer 190 provides an airflow between about 25% $W_{36}$ to about 50% $W_{36}$, but the main mixer 190 may provide a different amount of airflow as well.

To provide a higher airflow, the size of the pilot air inlet 170 and pilot flow passage 172 are increased. For example, the pilot flow passage 172 may have an increased radial height $H_p$ with respect to the fuel nozzle centerline axis CL. As such, the inner air circuit 162 and/or outer air circuit 164 may have an increased radial height such that the inner and/or outer swirl vanes 166, 168 also have an increased radial height. Generally, for a given operating condition of the engine 10, a 100% increase in the area of the pilot flow passage 172 normal to the air flowpath corresponds to a 100% increase in the percentage of the total combustor airflow to the pilot swirler 171. As an example, a known pilot swirler design may have a pilot airflow at a high power operating condition of 10% $W_{36}$, with a flow passage area, normal to the direction of airflow, of X. Increasing the flow passage area, normal to the direction of airflow, by 100% to 2X generally increases the pilot airflow at the high power operating condition to 20% $W_{36}$. Further, by utilizing CMC inner and outer liners 102, 104 to form the combustor 101 of the combustion assembly 100, less cooling airflow is needed in the combustor portion of the combustor system because CMC materials can withstand higher temperatures than other typical combustor liner materials, such as metallic materials. As such, less of the total airflow to the combustor 101 is needed to cool the liners 102, 104, such that more of the total combustor airflow is available to the pilot swirler 171 and main mixer 190. Therefore, the additional available airflow may be channeled through the pilot swirler 171 to increase the airflow through the pilot swirler, and the higher airflow through the pilot swirler 171 may be enabled by the pilot swirler design, e.g., through an increased area of pilot flow passage 172.

Conversely, to reduce or lower the main mixer airflow, the size of the main airflow passage 200 is decreased. For instance, the main mixer wall 196 is radially closer to the fuel nozzle outlet wall 121, which decreases the area of the flow passage 200 normal to the air flowpath by decreasing the radial height of the flow passage 200. As described with respect to increasing the area of the pilot flow passage 172, for a given operating condition of the engine 10, a 50% decrease in the area of the main flow passage 200 normal to the air flowpath generally corresponds to a 50% decrease in the percentage of the total combustor airflow to the main mixer 190.

Increasing the airflow to the pilot swirler 171, particularly during high power engine operations, may enable a different fuel split between the pilot fuel injector 138 and the main fuel injector 180, compared to known combustor system designs. In combustors, at least a portion of the fuel is distributed to the pilot fuel injector 138 at each engine operating condition, i.e., the pilot portion P of the fuel nozzle 113 is constantly supplied with fuel during engine operation. The portion of the fuel provided to the pilot fuel injector 138 may vary depending on the engine operating condition. For example, at start up and low power operating conditions, 100% of the fuel may go to the pilot fuel injector 138, while a lower percentage of the fuel goes to the pilot fuel injector 138 and the remainder to the main fuel injector 180 at high power conditions. Various transition fueling percentages may be used at power levels in between low power and high power.

Known combustors provide a small fraction of the combustor airflow to the pilot swirler, e.g., 10-13% $W_{36}$, such that the combustion system would not operate well at high power operating conditions if a relatively large portion of the fuel went to the pilot fuel injector. Typically, 10-20% of the fuel goes to the pilot fuel injector and 80-90% of the fuel goes to the main fuel injector at high power operating conditions because the main mixer, with its higher airflow in a typical combustor, provides better fuel/air mixing and reduced $NO_x$ emissions. However, a combustor incorporating the present subject matter as described herein, namely, a high airflow pilot swirler 171, can provide a much higher percentage of the fuel to the pilot fuel injector 138 at high power operating conditions because of the higher pilot airflow. The combustor system 100 described herein may enable up to 100% of the fuel through the pilot fuel injector 138 over the full range of engine operation. In some embodiments, the pilot fuel flow is within a range of about 30% to about 100% at high power, such that about 0% to about 70% of the fuel goes to the main injection ports 184 of the main fuel injector 180. High pilot fuel flow may reduce combustion dynamics, i.e., pressure oscillations in the combustor 101, and such high pilot fuel flows are made possible by the high pilot airflow split, where more air is available to mix with the fuel. As such, the combustor system 100 described herein allows reduced combustion dynamics, improved fuel/air mixing, and reduced $NO_x$ emissions. Further, as previously described, these and other features of the present combustor system 100 may help improve combustion efficiency, improve the durability of the fuel nozzle 113 and combustor liners 102, 104, reduce smoke emissions, and improve the profile/pattern factor of the engine.

As previously described, the inner liner 102 and outer liner 104 may be formed from a ceramic matrix composite (CMC) material, which is a non-metallic material having high temperature capability. In some embodiments, the combustor dome 114 also may be formed from a CMC material. More particularly, the combustor dome 114 may be integrally formed with the inner liner 102 and/or outer liner 104 from a CMC material, such that the combustor dome 114 and the inner liner 102 and/or outer liner 104 are a single piece. In other embodiments, the combustor dome 114 may be formed separately from the inner and outer liners, either as a separate CMC component or from another suitable material, such as a metal or metal alloy. As described above, it may be particularly useful to utilize CMC materials due to the relatively high temperatures of the combustion gases 66, and the use of CMC materials within the combustor system 100 may allow reduced cooling airflow to the CMC components. However, other components of engine 10, such as components of HP compressor 24, HP turbine 28, and/or LP turbine 30, also may comprise a CMC material.

Exemplary CMC materials utilized for such components may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration or chemical vapor infiltration with silicon, to arrive at a component formed of a CMC material having a desired chemical composition. In other embodiments, the CMC material may be formed as, e.g., a carbon fiber cloth rather than as a tape.

More specifically, examples of CMC materials, and particularly SiC/Si—SiC (fiber/matrix) continuous fiber-reinforced ceramic composite (CFCC) materials and processes, are described in U.S. Pat. Nos. 5,015,540; 5,330,854; 5,336, 350; 5,628,938; 6,024,898; 6,258,737; 6,403,158; and 6,503,441, and U.S. Patent Application Publication No. 2004/0067316. Such processes generally entail the fabrication of CMCs using multiple pre-impregnated (prepreg) layers, e.g., the ply material may include prepreg material consisting of ceramic fibers, woven or braided ceramic fiber cloth, or stacked ceramic fiber tows that has been impregnated with matrix material. In some embodiments, each prepreg layer is in the form of a "tape" comprising the desired ceramic fiber reinforcement material, one or more precursors of the CMC matrix material, and organic resin binders. Prepreg tapes can be formed by impregnating the reinforcement material with a slurry that contains the ceramic precursor(s) and binders. Preferred materials for the precursor will depend on the particular composition desired for the ceramic matrix of the CMC component, for example, SiC powder and/or one or more carbon-containing materials if the desired matrix material is SiC. Notable carbon-containing materials include carbon black, phenolic resins, and furanic resins, including furfuryl alcohol ($C_4H_3OCH_2OH$). Other typical slurry ingredients include organic binders (for example, polyvinyl butyral (PVB)) that promote the flexibility of prepreg tapes, and solvents for the binders (for example, toluene and/or methyl isobutyl ketone (MIBK)) that promote the fluidity of the slurry to enable impregnation of the fiber reinforcement material. The slurry may further contain one or more particulate fillers intended to be present in the ceramic matrix of the CMC component, for example, silicon and/or SiC powders in the case of a Si—SiC matrix. Chopped fibers or whiskers or other materials also may be embedded within the matrix as previously described. Other compositions and processes for producing composite articles, and more specifically, other slurry and prepreg tape compositions, may be used as well, such as, e.g., the processes and compositions described in U.S. Patent Application Publication No. 2013/0157037.

The resulting prepreg tape may be laid-up with other tapes, such that a CMC component formed from the tape comprises multiple laminae, each lamina derived from an individual prepreg tape. Each lamina contains a ceramic fiber reinforcement material encased in a ceramic matrix formed, wholly or in part, by conversion of a ceramic matrix precursor, e.g., during firing and densification cycles as described more fully below. In some embodiments, the reinforcement material is in the form of unidirectional arrays of tows, each tow containing continuous fibers or filaments. Alternatives to unidirectional arrays of tows may be used as well. Further, suitable fiber diameters, tow diameters, and center-to-center tow spacing will depend on the particular application, the thicknesses of the particular lamina and the tape from which it was formed, and other factors. As described above, other prepreg materials or non-prepreg materials may be used as well.

After laying up the tapes or plies to form a layup, the layup is debulked and, if appropriate, cured while subjected to elevated pressures and temperatures to produce a preform. The preform is then heated (fired) in a vacuum or inert atmosphere to decompose the binders, remove the solvents, and convert the precursor to the desired ceramic matrix material. Due to decomposition of the binders, the result is a porous CMC body that may undergo densification, e.g., melt infiltration (MI), to fill the porosity and yield the CMC component. Specific processing techniques and parameters for the above process will depend on the particular composition of the materials. For example, silicon CMC components may be formed from fibrous material that is infiltrated with molten silicon, e.g., through a process typically referred to as the Silcomp process. Another technique of manufacturing CMC components is the method known as the slurry cast melt infiltration (MI) process. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. The term "silicon carbide-containing fiber" refers to a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide.

Other techniques for forming CMC components include polymer infiltration and pyrolysis (PIP) and oxide/oxide processes. In PIP processes, silicon carbide fiber preforms are infiltrated with a preceramic polymer, such as polysilazane and then heat treated to form a SiC matrix. In oxide/oxide processing, aluminum or alumino-silicate fibers may be pre-impregnated and then laminated into a preselected geometry. Components may also be fabricated from a carbon fiber reinforced silicon carbide matrix (C/SiC) CMC. The C/SiC processing includes a carbon fibrous preform laid up on a tool in the preselected geometry. As utilized in the slurry cast method for SiC/SiC, the tool is made up of graphite material. The fibrous preform is supported by the tooling during a chemical vapor infiltration process at about 1200° C., whereby the C/SiC CMC component is formed. In still other embodiments, 2D, 2.5D, and/or 3D preforms may be utilized in MI, CVI, PIP, or other processes. For example, cut layers of 2D woven fabrics may be stacked in alternating weave directions as described above, or filaments may be wound or braided and combined with 3D weaving, stitching, or needling to form 2.5D or 3D preforms having multiaxial fiber architectures. Other ways of forming 2.5D or 3D preforms, e.g., using other weaving or braiding methods or utilizing 2D fabrics, may be used as well.

Thus, a variety of processes may be used to form a CMC inner liner 102 and a CMC outer liner 104, as well as any other CMC components of the combustor system 100, such as combustor dome 114, and/or engine 10. Of course, other suitable processes, including variations and/or combinations of any of the processes described above, also may be used to form CMC components for use with the various combustor system embodiments described herein.

As described herein, the present subject matter provides combustor systems having different airflow and fuel splits than known combustor systems. In particular, the present subject matter provides a relatively higher pilot swirler airflow and a relatively lower main mixer airflow, which allows a higher fuel flow to the pilot portion P of the fuel nozzle 113, particularly during high engine power operations. The different airflow splits may be enabled through the use of CMC combustor liners 102, 104, which require less cooling airflow than combustor liners made from different materials, such as metallic materials. The present subject matter also provides downstream angled fuel injection through the main fuel injector 180, which may help improve the durability of the downstream combustor components, such as the combustor liners 102, 104, as well as allow higher power operation of the engine. Further, in some embodiments, the angled fuel injection ports 184 may be formed by additively manufacturing the main fuel circuit 136, which manufacturing process may help precisely define the fuel injection ports 184. Moreover, the present subject matter provides cooling or purge holes through the pilot splitter 148, which may help improve the durability of the pilot splitter. As such, the combustor systems and fuel nozzle assemblies described herein allow engine operation at a relatively high fuel/air stoichiometry with high combustion efficiency, reduced or low combustion dynamics, improved fuel nozzle and combustor liner durability, low smoke and $NO_x$ emissions, and a reduced or low profile and pattern factor. The present subject matter may have other benefits and advantages as well.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A fuel nozzle assembly comprising:
   a fuel nozzle comprising a main fuel injector defining a centerline axis,
   a main mixer around the centerline axis defining an annular main mixer wall,
   a main airflow passage defined between the main fuel injector and the annular main mixer wall,
   the main fuel injector defining an angled main injection port, the angled main injection port defining an angled main injection port inlet end and an angled main injection port outlet end,
      wherein the angled main injection port outlet end is positioned downstream of the angled main injection poll inlet end relative to a fuel flow through the angled main injection port,
      wherein the angled main injection port is positioned at an angle relative to the centerline axis,
      wherein the angled main injection port is further positioned at an angle in a circumferential direction around the centerline axis such that the angled main injection port is non-orthogonal to the centerline axis,
      wherein the angled main injection port permits an egress of fuel from a main fuel circuit into the main airflow passage, and
   the main fuel injector further defining a radial main injection port, the radial main injection port defining a radial main injection port inlet end and a radial main injection port outlet end,
      wherein the radial main injection port is orthogonal to the centerline,
      wherein the radial main injection port permits an egress of fuel into the main airflow passage, and
   wherein the angled main injection port outlet end is positioned upstream or downstream of the radial main injection port outlet end relative to an airflow through the main airflow passage of the main mixer.

2. The fuel nozzle assembly of claim 1, wherein the fuel nozzle defines an annular fuel nozzle outer wall radially spaced apart from an annular outer boundary wall surrounding a pilot fuel injector, wherein the annular fuel nozzle outer wall defines an opening that permits a flow of air between the annular fuel nozzle outer wall and the annular outer boundary wall.

3. The fuel nozzle assembly of claim 1, wherein the fuel nozzle defines an aperture through the annular fuel nozzle outer wall, wherein the aperture is defined in alignment with the angled main injection port, and wherein the aperture defines an angle substantially equal to the angle of the angled main injection port.

4. The fuel nozzle assembly of claim 2, wherein the fuel nozzle defines an aperture through the annular fuel nozzle outer wall, wherein the aperture is defined in alignment with the radial Main injection port.

5. The fuel nozzle assembly of claim 1, wherein the fuel nozzle comprises a pilot fuel injector, wherein the pilot fuel injector comprises an pilot fuel injector annular inner wall defining a primary fuel orifice and a pilot fuel injector annular outer wall defining a secondary fuel orifice, and wherein a primary pilot supply line supplies fuel through the primary fuel orifice and a secondary pilot supply line supplies fuel through the secondary fuel orifice.

6. The fuel nozzle assembly of claim 5, further comprising: a fuel system comprising a pilot control valve coupled to a pilot fuel conduit and operable to supply a flow of fuel thereto, wherein the pilot fuel conduit is in fluid communication with the primary pilot supply line and the secondary pilot supply line.

7. The fuel nozzle assembly of claim 6, wherein the fuel system further comprises a first main valve fluidly coupled to a first main fuel conduit and operable to supply a flow of fuel thereto, wherein the first main fuel conduit is in fluid communication with a first the main fuel circuit of the fuel nozzle.

8. The fuel nozzle assembly of claim 7, wherein the fuel nozzle defines a different volume of the angled main fuel injection port relative to the radial main fuel injection port, or
   wherein the fuel nozzle defined a different cross sectional area of the angled main fuel injection port inlet end, or the angled main fuel injection port outlet end, relative to the radial main fuel injection port inlet end, or the radial main fuel injection port outlet end.

9. The fuel nozzle assembly of claim 1, Wherein the fuel nozzle further comprises a pilot fuel injector, wherein each of the main fuel injector and the pilot fuel injector are configured to receive a portion of a fuel flow.

10. A gas turbine engine, comprising:
    a combustor system comprising a combustion chamber; and
    a plurality of fuel nozzles, the plurality of fuel nozzles comprising:
    a first fuel nozzle comprising:
       a main fuel injector defining a centerline axis,
       a main mixer around the centerline axis defining an annular main mixer wall,
       a main airflow passage defined between the main fuel injector and the annular main mixer wall,
       the main fuel injector defining an angled main injection port, the angled main injection port defining an angled main injection port inlet end and an angled main injection port end,
          wherein the angled main injection port outlet end is positioned downstream of the angled main injection port inlet end relative to a fuel flow through the angled main injection port,
          wherein the angled main injection port is positioned at an angle relative to the centerline axis,
          wherein the angled main injection port is further positioned at an angle in a circumferential direction around the centerline axis such that the angled main injection port is non-orthogonal to the centerline axis,
          wherein the angled main injection port permits an egress of fuel from a main fuel circuit into the main airflow passage, and the main fuel injector further defining a radial main injection port the radial main port outlet end,
    wherein the radial main injection port is orthogonal to the centerline,
    wherein the radial main injection port permits an egress of fuel into the airflow passage, and
    wherein the angled main injection port outlet end is positioned upstream or downstream of the radial main injection port outlet end relative to an airflow through the main airflow passage of the main mixer; and
a second fuel nozzle comprising a second radial main injection port defining a second radial main injection port inlet end and a second radial main injection port outlet end, and wherein the second radial main injection port outlet end and the second radial main injection port inlet end are located in a plane perpendicular to a second centerline axis.

11. The gas turbine engine of claim 10, further comprising: a fuel system comprising a pilot control valve coupled to a pilot fuel conduit and operable to supply a flow of fuel thereto, wherein the pilot fuel conduit is in fluid communication with a primary pilot supply line and a secondary pilot supply line.

12. The gas turbine engine of claim 11, wherein the fuel system further comprises a first main valve coupled to a first main fuel conduit and operable to supply a flow of fuel thereto, wherein the first main fuel conduit is in fluid communication with the first main fuel circuit.

13. The combustor system of claim 12, wherein the first fuel nozzle defines a different cross sectional area of the angled main fuel injection port, the angled main injection port inlet end, or the angled main injection port outlet end, relative to a cross sectional area of the second radial main fuel injection port, the second radial main fuel injection port inlet end, or the second radial main fuel injection port outlet end.

14. The gas turbine engine of claim 10, wherein the fuel system further comprises:
    a first main valve fluidly coupled to a first main fuel conduit and operable to supply a flow of fuel thereto, wherein the first main fuel conduit is in fluid communication with the first main fuel circuit; and
    a second main valve fluidly coupled to a second main fuel conduit and operable to supply a flow of fuel thereto independent of the first main fuel conduit, wherein the second main fuel conduit is in fluid communication with a second main fuel circuit at the second fuel nozzle.

* * * * *